(12) United States Patent
Heisler et al.

(10) Patent No.: US 11,593,945 B2
(45) Date of Patent: Feb. 28, 2023

(54) METHODS AND SYSTEMS FOR SEMANTIC AUGMENTATION OF IMAGES

(71) Applicant: HUAWEI CLOUD COMPUTING TECHNOLOGIES CO., LTD., Gui'an New District (CN)

(72) Inventors: Morgan Lindsay Heisler, Burnaby (CA); Amin Banitalebi Dehkordi, Vancouver (CA); Yong Zhang, Richmond (CA)

(73) Assignee: HUAWEI CLOUD COMPUTING TECHNOLOGIES CO., LTD., Gui'an New District (CN)

( * ) Notice: Subject to any disclaimer, the term of this patent is extended or adjusted under 35 U.S.C. 154(b) by 103 days.

(21) Appl. No.: 17/202,265

(22) Filed: Mar. 15, 2021

(65) Prior Publication Data

US 2022/0292685 A1 Sep. 15, 2022

(51) Int. Cl.
*G06T 7/11* (2017.01)
*G06N 3/08* (2023.01)

(52) U.S. Cl.
CPC ................. *G06T 7/11* (2017.01); *G06N 3/08* (2013.01); *G06T 2207/20081* (2013.01); *G06T 2207/20084* (2013.01)

(58) Field of Classification Search
CPC .................. G06T 19/006; G06T 19/20; G06T 2207/20081; G06T 2207/20084;
(Continued)

(56) References Cited

U.S. PATENT DOCUMENTS

| 8,983,179 | B1 * | 3/2015 | Yu ...................... G06V 10/7515 700/47 |
| 10,373,073 | B2 | 8/2019 | Kisilev |

(Continued)

FOREIGN PATENT DOCUMENTS

| CN | 111738231 A | 10/2020 |
| CN | 112102303 A | 12/2020 |
| WO | 2019237240 A1 | 12/2019 |

OTHER PUBLICATIONS

Buslaev A, Iglovikov VI, Khvedchenya E, Parinov A, Druzhinin M, Kalinin AA. Albumentations: Fast and Flexible Image Augmentations. Information; 11(2):125 2020.
(Continued)

*Primary Examiner* — Ajibola A Akinyemi

(57) ABSTRACT

Methods and systems for generating a semantically augmented image are disclosed. An embedding is generated for each object label associated with a segmented input image. For each embedding associated with a respective object label, a similarity score is computed between the embedding associated with the object label and an embedding representing an object class in an object bank storing a plurality of object images. At least one object is selected, the selected object being associated with a respective object image in the object bank, the selected at least one object being from an identified object class that is identified as contextually relevant to at least one object label associated with the segmented input image, based at least on the similarity score. The selected object is added into the segmented input image to generate the augmented image.

20 Claims, 6 Drawing Sheets

(58) Field of Classification Search
CPC ........... G06T 11/60; G06T 2207/30148; G06T 2207/10056; G06T 7/0004; G06T 13/80; G06T 2207/20221; G06T 5/50; G06T 1/20; G06T 2207/10024; G06T 2207/20076; G06T 2207/20132; G06T 2207/20224; G06T 2207/30128; G06T 3/40; G06T 5/003; G06T 7/001; G06T 7/194; G06T 7/40; G06T 7/41; G06T 7/70
USPC ........................................................ 382/173
See application file for complete search history.

(56) References Cited

U.S. PATENT DOCUMENTS

| | | |
|---|---|---|
| 2008/0317358 A1 | 12/2008 | Bressan et al. |
| 2018/0121988 A1* | 5/2018 | Hiranandani ......... G06F 16/583 |

OTHER PUBLICATIONS

DeVries, Terrance, and Graham W. Taylor. "Improved regularization of convolutional neural networks with cutout." arXiv preprint arXiv:1708.04552 2017.

Zhang, Hongyi, et al. "mixup: Beyond empirical risk minimization." arXiv preprint arXiv:1710.09412 2017.

Yun, Sangdoo, et al. "Cutmix: Regularization strategy to train strong classifiers with localizable features." Proceedings of the IEEE International Conference on Computer Vision 2019.

Hendrycks, D., Mu, N., Cubuk, E. D., Zoph, B., Gilmer, J., & Lakshminarayanan, B. Augmix: A simple data processing method to improve robustness and uncertainty. arXiv preprint arXiv:1912.02781 2019.

Ghiasi, Golnaz, et al. "Simple Copy-Paste is a Strong Data Augmentation Method for Instance Segmentation." arXiv preprint arXiv:2012.07177 2020.

Nikita Dvornik, Julien Mairal, and Cordelia Schmid. "Modeling visual context is key to augmenting object detection datasets" Proceedings of the European Conference on Computer Vision (ECCV). 2018.

Dwibedi, Debidatta, Ishan Misra, and Martial Hebert. "Cut, paste and learn: Surprisingly easy synthesis for instance detection." Proceedings of the IEEE International Conference on Computer Vision 2017.

Tan, Mingxing, Ruoming Pang, and Quoc V. Le. "Efficientdet: Scalable and efficient object detection." Proceedings of the IEEE/CVF conference on computer vision and pattern recognition 2020.

Hong, S., Yan, X., Huang, T., & Lee, H. Learning hierarchical semantic image manipulation through structured representations arXiv preprint arXiv:1808.07535 2018.

Lee, D., Liu, S., Gu, J., Liu, M. Y., Yang, M. H., & Kautz, J. Context-aware synthesis and placement of object instances arXiv preprint arXiv:1812.02350. 2018.

* cited by examiner

600

1. Will you use your own model or one of ours? 602
   ● My own  [UPLOAD]   ○ Cloud AI Model   [SELECT MODEL]
2. Will you use your own dataset or one of ours? 604
   ● My own  [UPLOAD]   ○ Cloud AI Dataset  [SELECT MODEL]
3. Please check the augmentations you wish to use:

● Horizontal Flip
   ● Vertical Flip          606
   ● Rotate   [LOWER BOUND]   [UPPER BOUND]
   ● Semantic Augmentation Because you selected semantic augmentation, please fill in the following:

1. Please select a pre-trained word embedding and dimension size 608
   Word Embedding  [SELECT]   Dimension  [SELECT DIMENSION]
2. If using your own dataset, is it segmented? 610
   ○ Yes  ● No  [SELECT SEGMENTATION MODEL]
3. If using your own dataset, please upload word labels for each category 612
   [UPLOAD]
   1. Please check below to see if any labels were not found in the database, if so please select the best alternative:
                                                                                              614
      | Traffic Light | stoplight |
      | Waterdrops    | traffic   |

Because you selected semantic augmentation, please fill in the following:

4. Please select a method for similarity: 616
   ○ Euclidean Distance         ● Cosine Similarity
5. Please select how many of the top most similar objects to consider at once: 618
   [INSERT # 1-5]
6. Please select a method for choosing the object: 620
   ○ # of instances           ● Baseline mAP
7. Please select object augmentation to perform: 622
   ● Horizontal Flip     ● Rotate
   ● Vertical Flip       ● Scale

FIG. 6

METHODS AND SYSTEMS FOR SEMANTIC AUGMENTATION OF IMAGES

FIELD

The present disclosure relates to methods and systems for semantic augmentation of images, including methods and systems for semantic augmentation of images to be used in a training dataset for training a neural network which performs a prediction task, such as object detection or segmentation.

BACKGROUND

In the field of computer vision, a neural network which performs a prediction task on images (e.g., object detection, object classification, semantic segmentation, image classification, etc.) is often trained using a training dataset that includes labeled training images, in a supervised fashion. Successful training of a neural network (e.g., to achieve a desired level of accuracy in the predictions generated by the neural network) typically relies on the availability of training datasets which contain a sufficient amount of representative data. In examples where a deep neural network (DNN) which performs a prediction task for images (e.g., object detection in an image) is trained, accuracy of the trained DNN typically depends on the training dataset used to train the DNN including a sufficient number of labeled images that are representative of the object classes of interest. In many image datasets that have been developed for training DNN which performs object detection, there can be an imbalance in the object classes in the training dataset (e.g., some object classes are overrepresented in the training dataset and/or other object classes are underrepresented in the training dataset). The result is that the DNN is trained using such an imbalanced image dataset may have poor performance with respect to detection of underrepresented object classes in new images input to the DNN during inference. However, collecting images that include objects of the underrepresented object classes and labeling the collected images are typically time consuming and costly (e.g., requiring a human to manually label the collected images).

Various existing techniques have been developed to help improve the accuracy of the trained DNN, including techniques to artificially expand the size (i.e., number of training samples) included in the training dataset. Image augmentation methods are techniques that can be used to artificially expand the size (i.e., number of training images) included in a training dataset used to train a DNN which performs a prediction task for images. Image augmentation methods involve generating modified versions of the original training images included in the training dataset. The training of many modern DNNs involves some form of image augmentation method during the training.

Some existing image augmentations methods rely on geometric or photometric changes (e.g., changing image scale, rotating image, changing image colorization, etc.) to globally modify a training image of the training dataset. However, such existing image augmentation methods do not augment the object-specific information in the training image. Therefore, these existing image augmentation methods cannot mitigate the problem of class imbalance in a training dataset used to train a DNN that performs a prediction task for images.

It would be useful to provide an object-aware method for image augmentation.

SUMMARY

The present disclosure presents example methods and systems for semantic augmentation of images, where the semantic augmentation of images is based on object-level context. This means that an image is augmented by the addition of a new object into the image, where the new object is contextually relevant to at least one existing object in the image.

The example methods and systems for semantic augmentation of images described herein adapt natural language processing (NLP) techniques (e.g., using word embeddings) to identify one or more new objects that are contextually relevant to at least one existing object in an image, based on similarity of words in the respective object class labels. The disclosed methods and systems for semantic augmentation of images enable identification of contextually relevant objects that can be used to augment an image, without requiring the use of an additional neural network (and without requiring the use of additional processing power and memory resources) to learn the context of the image. The present disclosure provides the technical result that an augmented image is generated from an existing image by adding a contextually relevant object into the existing image, and, in at least some examples, enable the generation of the augmented image using fewer computing resources (e.g., fewer memory resources and less processing power).

The example system and method for semantic augmentation of images described herein may be implemented as part of a machine learning as a service (MLaaS) provided by a cloud computing service provider whose cloud computing platform is accessible by a client device via a communication network (e.g. the Internet). For example, a cloud computing platform may provide a MLaaS that includes different machine learning services, including a training service which uses a semantically augmented image dataset to train a neural network which performs a prediction task for images on behalf of a client device. In some examples, the system and method for semantic augmentation of images described herein may be implemented for semantically augmenting an image dataset which can then be provided by the cloud computing platform to the client device to train a neural network which performs a prediction task for images stored at the client device.

According to an example aspect of the present disclosure, there is provided a method for semantic augmentation of images. The method includes generating an embedding for each object label associated with a segmented input image, and for each embedding associated with a respective object label, computing a similarity score between the embedding associated with the object label and an embedding representing an object class in an object bank comprising a plurality of object images. The method also includes selecting at least one object, associated with a respective object image in the object bank, the selected at least one object being from an identified object class that is identified as contextually relevant to at least one object label associated with the segmented input image, based at least on the similarity score; and adding the selected at least one object into the segmented input image to generate an augmented image.

In the preceding example aspect of the method of the present disclosure, generating the embedding for each object label may include: accessing a dictionary of embeddings containing a plurality of entries each associating a text string with a respective corresponding embedding; and selecting the embedding for each object label by looking up the text string in the dictionary of embeddings corresponding to each object label.

In any of the preceding example aspects of the method of the present disclosure, computing the similarity score may include computing a cosine similarity or a Euclidean distance between the embedding associated with the respective object label and the embedding representing the object class in the object bank.

In any of the preceding example aspects of the method of the present disclosure, adding the selected at least one object may include applying a pixel-wise mask to the respective object image to segment the at least one object from the respective object image, and adding the segmented at least one object into the segmented input image.

In any of the preceding example aspects of the method of the present disclosure, adding the selected at least one object may include: identifying a contextually relevant object in the segmented input image, the contextually relevant object being identified based on the similarity score with the selected at least one object; and adding the selected at least one object in a selected location relative to a location of the contextually relevant object.

In any of the preceding example aspects of the method of the present disclosure, the selected at least one object may be from the identified object class that is identified based on a selection criterion to improve the original image dataset or to improve performance of the trained neural network.

In any of the preceding example aspects of the method of the present disclosure, the method may include: performing object segmentation to an input image to generate the segmented input image.

In any of the preceding example aspects of the method of the present disclosure, adding the selected at least one object may include performing object augmentation on the selected at least one object, and adding the augmented at least one object into the segmented input image to generate the augmented image.

In any of the preceding example aspects of the method of the present disclosure, the method may include performing global image augmentation on the augmented image.

In any of the preceding example aspects of the method of the present disclosure, the method may include: sampling the segmented input image from an image dataset; and storing the augmented image in the same or different image dataset.

According to another example aspect, the present disclosure provides a method for improving performance of a neural network trained using an original image dataset. The method includes: generating an augmented image dataset from an original image dataset by, for one or more segmented images sampled from the original image dataset, generating a respective semantically augmented image by: generating an embedding for each object label associated with the segmented image; for each embedding associated with a respective object label, computing a similarity score between the embedding associated with the object label and an embedding representing an object class in an object bank storing a plurality of object images; selecting at least one object, associated with a respective object image in the object bank, the selected at least one object being from an identified object class that is identified as contextually relevant to at least one object label associated with the segmented input image, based at least on the similarity score; and adding the selected at least one object into the segmented image to generate the respective semantically augmented image. The neural network is trained using the augmented image dataset.

In the preceding another example aspect of the method of the present disclosure, the augmented image dataset may be trained using any of the methods described above.

In any of the preceding another example aspects of the method of the present disclosure, the one or more segmented images sampled from the original image dataset may be a portion of all images contained in the original image dataset.

In any of the preceding another example aspect of the method of the present disclosure, for one or more images from the original image dataset that is not used to generate semantically augmented images, global image augmentation may be performed to generate globally augmented images for the augmented image dataset.

In any of the preceding another example aspect of the method of the present disclosure, computing the similarity score may include computing a cosine similarity or a Euclidean distance between the embedding associated with the respective object label and the embedding representing the object class in the object bank.

In any of the preceding another example aspect of the method of the present disclosure, adding the selected at least one object may include: identifying a contextually relevant object in the segmented image, the contextually relevant object being identified based on the similarity score with the selected at least one object; and adding the selected at least one object in a selected location relative to a location of the contextually relevant object.

In any of the preceding another example aspect of the method of the present disclosure, the selected at least one object may be from the identified object class that is identified based on a selection criterion to improve the original image dataset or to improve performance of the trained neural network.

In any of the preceding another example aspect of the method of the present disclosure, the selection criterion may be one of: identifying an object class that is underrepresented in the original image dataset as the identified object class; or identifying an object class for which the neural network underperforms as the identified object class.

In any of the preceding another example aspect of the method of the present disclosure, the method may include: performing global image augmentation on the semantically augmented image.

In any of the preceding another example aspect of the method of the present disclosure, the augmented image dataset may be generated by adding the respective semantically augmented image to the original image dataset.

In any of the preceding another example aspect of the method of the present disclosure, the augmented image dataset may be generated by creating a new image dataset using the respective semantically augmented image.

In any of the preceding another example aspect of the method of the present disclosure, the method may be performed by a cloud computing platform, a virtual machine, or a computing cluster.

According to another example aspect, the present disclosure provides a computing system including: a memory storing instructions; and a processing device in communication with the memory. The processing device is configured to execute the instructions stored in the memory to cause the computing system to perform any of the methods described above.

According to another example aspect of the present disclosure, there is provided a non-transitory computer-readable medium having instructions encoded thereon which when executed by a computing system cause the computing system to perform any of the methods described above.

According to another example aspect of the present disclosure, there is provided a computer program comprising instructions which, when executed by a computing system cause the computing system to perform any of the methods described above.

BRIEF DESCRIPTION OF THE DRAWINGS

Reference will now be made, by way of example, to the accompanying drawings which show example embodiments of the present application, and in which:

FIG. 6 illustrates an example user interface that may be used for implementing example embodiments described herein.

Similar reference numerals may have been used in different figures to denote similar components.

DESCRIPTION OF EXAMPLE EMBODIMENTS

Figure 1:
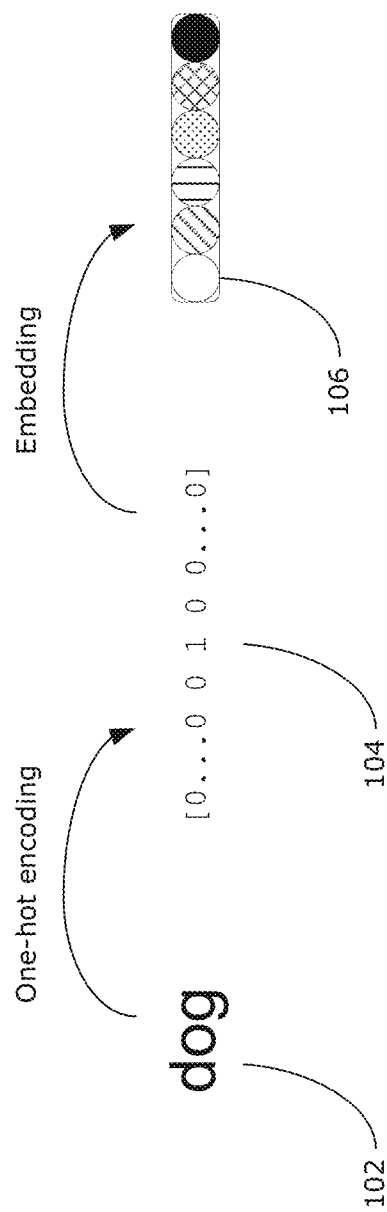
FIG. 1 illustrates an example of how a word in an object label is processed into a word embedding.

In example embodiments disclosed herein, methods and systems are described for image augmentation that takes into account the object-level context of the image. The example methods and systems disclosed herein may help to address the problem of class imbalance in image datasets.

In an image dataset that is used to train a neural network which performs a prediction task for images, such as an object detection, each object in a training image of the image dataset is associated with a respective object class label identifying the object class. However, an image dataset may have a problem of class imbalance. For example, the class distribution in the image dataset (i.e., the distribution of object classes represented by all object class labels in the image dataset) can be skewed such that there is a minority class that is underrepresented. This means that the number of images in the dataset that are associated with an object class label representing the minority object class is statistically rare compared to the number of images associated with other object classes. The result of training a neural network using an image dataset having class imbalance is that the trained neural network has suboptimal performance when generating predictions (e.g., performing object detection) for unlabeled images that contain objects in the minority class.

Image augmentation methods are techniques used to augment the images in an image dataset, to enrich the images used for training a neural network which performs a prediction task for images and hence to improve the performance of the trained neural network in generating predictions (e.g. in generating predicted object class labels for each object detected in each respective image). Image augmentation methods can be used to generate new images, to help balance the class distribution in an image dataset. To assist in understanding the present disclosure, some existing methods for image augmentation (i.e. image augmentation methods) are first discussed.

As previously mentioned, some existing image augmentation methods modify an image on a global (or whole-image) level. That is, the modification is applied to the image as a whole, without consideration of the semantic content of the input image or individual objects in the image. Examples of global image augmentation include geometric methods (e.g., image flipping, image cropping, image rotation, among others) and photometric methods (e.g., applying color jitter, applying edge enhancement, adding noise to the image, or changing to grayscale, among others). Such global image augmentation methods do not address the problem of class imbalance in an image dataset.

Some more advanced image augmentation methods have also been developed. CutOut (e.g., described by DeVries et al. "Improved regularization of convolutional neural networks with cutout", arXiv preprint arXiv:1708.04552, 2017) is an image augmentation method whereby the normalized features of one instance of an object are combined with the feature moments of another instance of an object, enabling the smoothing out of different directions of the decision boundary. Mixup (e.g., described by Zhang et al. "mixup: Beyond empirical risk minimization", arXiv preprint arXiv:1710.09412, 2017) interpolates two training inputs in feature and label space simultaneously. Cutmix (e.g., described by Yun et al. "Cutmix: Regularization strategy to train strong classifiers with localizable features", *Proceedings of the IEEE International Conference on Computer Vision*, 2019) randomly crops a rectangular region of an image and pastes the cropped rectangular region into another image, mixing the labels proportional to the number of pixels contributed by each input image to the final augmented image. However, such existing image augmentation methods do not take into consideration the context of the actual objects in the input image.

Some object-level image augmentation methods currently exist. Object-level image augmentation methods modify the actual objects in an input image, for example by adding a new object into the input image to generate a new image. An example existing object-level image augmentation method is Copy-Paste (e.g., described by Ghiasi et al. "Simple Copy-Paste is a Strong Data Augmentation Method for Instance Segmentation", arXiv preprint arXiv:2012.07177, 2020). In Copy-Paste, two input images are randomly selected, random scale jittering is applied and then a subset of object instances from one input image is randomly selected to paste onto the other input image. The result is a generated image with added instances of object (i.e. object instances), however there is no consideration about the semantic content of the input images and contextual relevance of the added objects. This means that the generated image may contain added objects that are not relevant to the overall scene of the image (e.g., an airplane may be pasted in an image of an underwater scene) and that may not be representative of real-life images. A neural network which performs a prediction task for images that is trained using an image dataset that includes such generated images may learn improper associations, leading to accuracy loss in the predictions generated by the neural network.

A method for object-level image augmentation that takes into consideration the context of the input image has been developed (e.g., described by Dvornik et al. "Modeling visual context is key to augmenting object detection datasets", *Proceedings of the European Conference on Computer Vision (EECV)*, 2018). In this previously developed method for object-level image augmentation, a context neural network is trained to predict an object class that would fit in the context of an image. However, the use of an additional context neural network introduces additional overhead (e.g., requiring significant additional processing power and memory resources) and is dataset-dependent (e.g., the context neural network requires retraining for each domain).

In various examples, the present disclosure describes methods and systems for semantic augmentation of images that enables contextually relevant, object-level image augmentation, without requiring the use of an additional neural network for identifying the context of an image.

The example methods and systems for semantic augmentation of images described herein use word embeddings to identify a contextually relevant object that may be used to augment an input image. Word embeddings have been used in natural language processing (NLP) methods to encode the semantic meaning of words. To assist in understanding the present disclosure, a discussion of word embeddings and some related terminology is now presented.

FIG. 1 illustrates a simplified example of how a word embedding may be generated from a word. A word may be included in a corpus. A corpus is a collection of texts representing a language domain (typically a single language). The corpus includes a plurality of words, and the words typically have a relationship to each other based on their relative positions in a sequence of words (e.g., in a sentence). The corpus may also include non-words, such as symbols (e.g., "?", "!" and other punctuation), whitespace or numeric characters.

Tokenization is a technique that separates the corpus into units referred to as tokens. Tokens are frequently words, with non-words discarded. In some examples, a token may be a phrase or a group of words. For example, the text string "Come here, dog!" may be tokenized into the tokens "Come", "here" and "dog". In FIG. 1, the token 102 "dog" is illustrated. The token 102 may be encoded into a sparse vector representation such as a one-hot vector 104. In the one-hot vector 104, there is only one non-zero entry (typically with a value of "1") at the index corresponding to the token 102 and all other entries are zero. The one-hot vector 104 may be further processed into a dense vector representation of the token 102, referred to as an embedding 106 (or more particularly a word embedding in the example where the embedding 106 represents a word). An embedding 106 is a numerical vector representation of the token 102 (which may be a word or a phrase, for example) that is denser than the one-hot vector 104 (i.e., having more non-zero values) and that represents tokens 102 in a way that results in semantically-related tokens 102 to be closer to each other in a vector space (where the vector space is the space defined by all embeddings 106 generated from the corpus). For example, a first embedding 106 representing the token "dog" and a second embedding 106 representing the token "puppy" should be closer to each other in the vector space compared to the distance between the first embedding 106 representing the token "dog" and a third embedding 106 representing the token "cake".

The dimensionality of the embedding 106 may depend on the technique used to learn the embedding 106. For example, in FIG. 1, the embedding 106 is represented as a 1×6 vector (i.e., having a dimensionality of 6), with different shading used to represent the different values (or weights) of each dimension in the embedding 106. Although the embedding 106 in this example is shown with a dimensionality of 6, in general an embedding 106 may have any dimensionality, typically greater than 6 (e.g., a dimensionality on the order of tens or hundreds). Various techniques may be used to learn an embedding 106 of a given token. For example, unsupervised representation learning may be used to learn the embedding 106 (e.g., learn the weights of each entry, or dimension, in the embedding 106) of a given token 102. Some existing machine-learning based embedding generation techniques include Bidirectional Encoder Representations from Transformers (BERT) (e.g., described by Devlin et al. "BERT: Pre-training of Deep Bidirectional Transformers for Language Understanding", arXiv preprint arXiv: 1810.04805v2, 2019), Word to Vector (Word2Vec) (e.g., described by Mikolov et al. "Distributed Representations of Words and Phrases and their Compositionality", arXiv preprint arXiv:1310.4546, 2013), Global Vectors (GloVe) (e.g., described by Pennington et al. "GloVe: Global Vectors for Word Representation", *Proceedings of the* 2014 *Conference on Empirical Methods in Natural Language Processing* (*EMNLP*), pp. 1532-1543, 2014), and fastText (e.g., described by Bojanowski et al. "Enriching Word Vectors with Subword Information", arXiv preprint arXiv: 1607.04606v2, 2017).

The entire corpus may be similarly processed to learn a plurality of embeddings 106, each having the same number of dimensions (also referred to as having the same number of features, or same number of entries). The collection of embeddings 106 learned from the tokens of the corpus may represent the vector space, or latent code space, that represents the vocabulary contained in the corpus as well as the semantic relationships in the vocabulary.

Figure 2:
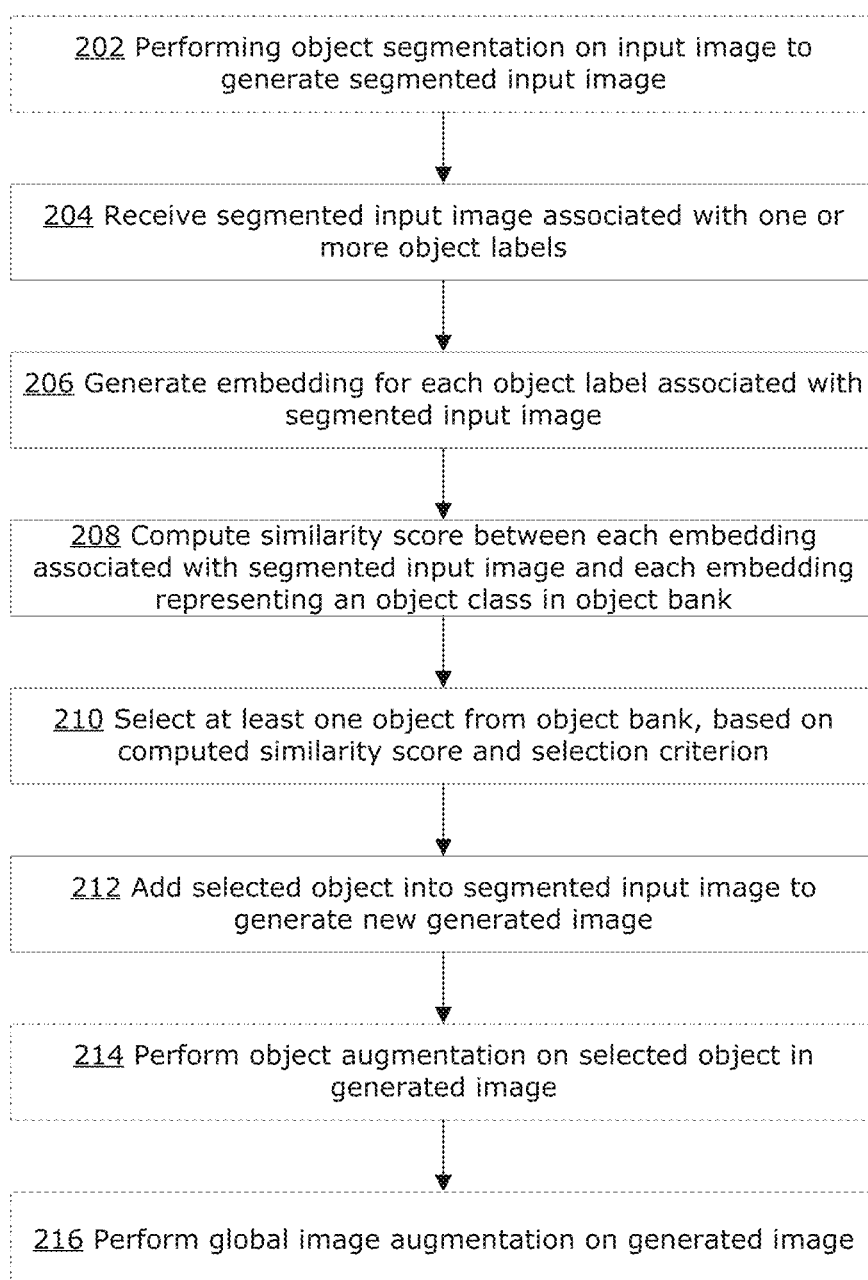
FIG. 2 is a flowchart of an example method for augmenting an image.

FIG. 2 is a flowchart illustrating an example method 200 for semantic augmentation of the input image. The method 200 generates a new image from an input image, where the generated image is a semantic augmentation of the input image. In this example, semantic augmentation of the input image means that the image is augmented by the addition of at least one new object into the image, where the new object is contextually relevant to one or more original objects in the input image. The method 200 may be used to generate a new image that can be added to an image dataset, for example to compensate for class imbalance in the image dataset, or to introduce a new object class to the image dataset, among other applications.

The method 200 may be used to generate a new image from any input image. The input image may be a static image (e.g., a digital photograph), or a dynamic image (e.g., a sequence of one or more frames from a digital video). The input image may be an image sampled from an image dataset, or may be an image that is not part of any image dataset. In examples where the input image is sampled from an image dataset, the generated image may be added to the same image dataset, may be added to a different image dataset and/or may be used to create a new image dataset, among other possibilities.

Optionally, at 202, object segmentation is performed on an input image to generate a segmented input image. Object segmentation may be performed using any suitable DNN that performs segmentation on input images, such as MaskRCNN (e.g., described by He et al. "Mask R-CNN", arXiv preprint arXiv:1703.06870v3, 2018) or U-Net (e.g., described by Ronneberger et al. "U-Net: Convolutional Networks for Biomedical Image Segmentation", arXiv preprint arXiv:1505304597v1, 2015), among other possibilities. The result of object segmentation is a generated segmented input image, in which objects in the generated segmented input image have been detected and associated with a respective object class label. The group of pixels belonging to each instance of a detected object are identified and associated with the respective object class label. Additionally or alternatively, a bounding box representing the location of each instance of a detected object is defined (e.g., defined by the x and y coordinates of the corners of the bounding box, in the frame of reference of the segmented input image) and associated with the respective object class label. The result is that the segmented input image is associated with a set of one or more object class labels and also associated with a set of pixel groups and/or bounding boxes for each respective object class label.

In some examples, object segmentation may be performed prior to the method 200 (e.g., an input image that is sampled from the image dataset may already be segmented) and step 202 may be omitted.

At 204, the segmented input image, which is associated with one or more object class labels, is received. The segmented input image may be received as a result of performing object segmentation at optional step 202 (i.e., receiving the segmented input image may include generating the segmented input image from an unlabeled input image). The segmented input image may be received by sampling the segmented input image from an image dataset. The segmented input image may also be received as input from any other image source.

At 206, an embedding is generated for each object class label associated with the segmented input image. For example, each object class label may be a text string (such as a word, group of words or a phrase) associated with a respective object (e.g., defined by a bounding box and/or by a set of pixels assigned to that object) in the segmented input image. A suitable embedding technique (e.g., BERT, Word2Vec, GloVe, or fastText) may be selected to generate a respective embedding for each object class label. For example, an embedding technique may be selected (e.g., by a user) from among a plurality of possible embedding techniques (via a graphical user interface rendered on a client device as described below with reference to FIG. 6). In other examples, the embedding technique may be predefined or selected by default (e.g., without requiring selection by a user). Using the selected embedding technique, a pre-trained neural network (which may also be referred to as a pre-trained embedder) may have already processed an existing corpus to generate a collection of embeddings. The collection of embeddings may be stored as a dictionary of embeddings, in which each entry in the dictionary is a text string (e.g., a word or phrase) that is associated with a corresponding embedding generated by the pre-trained embedder. An embedding may then be generated for each object class label associated with the segmented input image by looking up each object class label in the dictionary of embeddings to identify and select the corresponding embedding that represents each respective object class label. In some examples, tokenization may be performed prior to or as part of the embedding generation. For example, tokenization may be required if an object class label includes multiple words (e.g., includes a phrase) and/or includes punctuations. The result of step 206 is a set of one or more embeddings associated with the segmented input image, where each embedding represents the object class label for a respective object in the segmented input image.

In some examples, the segmented input image may already be associated with embeddings representing the objects in the segmented input image (e.g., if the segmented input image was previously used in a previous semantic augmentation using the method 200) and step 206 may be omitted. For example, the segmented input image may be sampled from an image dataset that has already been augmented previously (e.g., to achieve a target objective, such as to balance the class distribution in the image dataset), and that is being augmented again (e.g., to achieve a different target objective, such as to introduce a new object class into the image dataset).

In some examples, an embedding may not be generated for a given object class label using a selected embedding technique. For example, the given object label may use a word or phrase that does not have a corresponding embedding representing that word or phrase in the vector space, or that does not have a corresponding entry in the dictionary of embeddings. Any object class label for which an embedding cannot be generated may be flagged for further processing. For example, input from a user may be requested to provide an alternative object class label for which an embedding may be generated. For example, a user may be provided with a list of possible synonyms for the object class label (e.g., obtained by looking up the object class label in a digital thesaurus) and be asked to select one synonym. The embedding may then be generated using the selected synonym.

In some examples, no user input may be required to provide an alternative object class label. For example, instead of asking a user to select a synonym from a list of possible synonyms, a most likely synonym may be identified without user input by generating a list of possible synonyms (e.g., obtained by querying a digital thesaurus) and selecting the most commonly used synonym (e.g., based on word usage indicated in the digital thesaurus) as the alternative object class label from which an embedding can be generated (e.g., a common synonym "cupboard" may be used to generate an embedding instead of the object class label "cabinet"). In another example, if a given object class label does not have a corresponding embedding that can be generated, the object class label may be further broken down into smaller tokens (e.g., splitting a compound word into subwords, removing suffixes and affixes, etc.) and an embedding may be generated from the smaller tokens (e.g., the object class label "waterdrop" may be broken down into the tokens "water" and "drop", and embeddings may be generated from the smaller tokens). In another example, if a given object class label does not have a corresponding embedding that can be generated and the object class label is tokenized into multiple tokens, two or more of the tokens may be combined (e.g., concatenated) and an embedding may be generated from the combined token (e.g., the tokens "eye" and "glasses" may be combined into a single token "eyeglasses", and an embedding may be generated from the combined token).

In some examples, if a given embedding technique is unable to generate embeddings for all object class labels associated with the segmented input image, a different embedding technique may be selected instead. For example, if a word embedding technique does not generate embeddings for all object class labels associated with the segmented input image, a sequence embedding technique (or phrase embedding technique) technique may be used instead.

At 208, a similarity score is computed between each embedding associated with the segmented input image and each embedding representing an object class in an object bank. The object bank is database that stores object images, where each object image represents a single object from one of a plurality of object classes. Every object image in the object bank is associated with a respective embedding representing the corresponding object class. Each object image may also be associated with a respective mask that segments the object from the background of the object image. For example, the mask may be a pixel-wise binary mask that indicates the pixels in the object image corresponding to the object (thus segmenting the object from the background of the object image). In some examples, such as where the object image has a plain white or black background, it may not be necessary for there to be a mask associated with the object image. Further details of the object bank, including an example method for generating the object bank, are described further below.

The similarity score is computed between each embedding associated with the segmented input image and each object class in the object bank. That is, if there are n embeddings associated with the segmented input image (corresponding to n objects detected in the segmented input image) and there are m object classes in the object bank, n×m similarity scores are computed.

The similarity score may be any metric that is representative of how close two embeddings are to each other in the vector space (where the vector space is defined by the collection of all embeddings generated from the corpus of all object class labels in the object bank). As previously explained, the distance between two embeddings in the vector space represents the semantic relationship between the tokens (e.g., words) represented by the embeddings. Thus, two embeddings that are closer to each other in the vector space are more semantically related and contextually relevant than two embeddings that are farther from each other in the vector space. Some example metrics that may be used as the similarity score include cosine similarity and Euclidean distance, among others.

For example, to compute the similarity score between one embedding (e.g., a vector denoted as A) associated with the segmented input image and another embedding (e.g., a vector denoted as B) representing an object class in the object bank, a cosine similarity may be computed as follows:

$$\text{Cosine Similarity}(A, B) = \frac{A \cdot B}{\|A\|\|B\|}$$

In another example, the similarity score between embedding A and embedding B may be computed using the Euclidean distance, as follows:

$$\text{Euclidean Distance}(A,B) = \sqrt{(x_B - x_A)^2 + (y_B - y_A)^2}$$

where $x_A$ and $x_B$ represent the Euclidean x-coordinates of embedding A and embedding B, respectively, in the vector space; and $y_A$ and $y_B$ represent the Euclidean y-coordinates of embedding A and embedding B, respectively. It should be noted that this example Euclidean distance computation illustrates a computation in a relatively simple two-dimensional vector space. In general, the vector space may be higher-dimensional (e.g., having tens or hundreds of dimensions, depending on the dimensionality of the embeddings) and the Euclidean distance computation should be modified accordingly.

Regardless of how the similarity score is computed, the result of step 208 is a collection of similarity scores representing the similarity (and hence contextual relevance) between each labeled object in the segmented input image and each object class in the object bank.

In some examples, the similarity scores may be computed with respect to one or more object classes of interest (rather than with respect to all object classes in the object bank). For example, a defined selection criterion (discussed in more detail with respect to step 210 below) may indicate one or more particular object classes that should be added to the segmented input image. The similarity scores may thus be computed between the embeddings associated with the segmented input image and the embeddings representing the one or more object classes of interest (rather than all object classes in the object bank). This may reduce the number of computations required at step 208.

At 210, at least one object is selected from the object bank, based on the computed similarity scores and a defined selection criterion. The at least one object is selected from at least one object class of the object bank that is identified to be contextually relevant to the labeled object(s) in the segmented input image and that is related to a target objective of the semantic augmentation.

The selection of at least one object from the object bank may including first identifying a number (e.g., up to a defined number, such as five or ten) of object classes from the object bank having the highest similarity scores. Having high similarity scores means that the identified object classes are contextually relevant to the labeled objects in the segmented input image.

From among the identified object classes, one (or more) object class is selected according to the defined selection criterion. The selection criterion may be defined based on a target objective (or intended purpose) of the semantic augmentation. For example, if the semantic augmentation is intended to correct for a lack of object instances corresponding to a given object class in an image database (e.g., the target objective is to increase the number of object instances belonging to the given object class), the selection criterion may be to select an object from the object bank belonging to that given object class. In another example, if the semantic augmentation is intended to correct for any class imbalance in general (e.g., the target objective is to increase the number of object instances belonging any underrepresented class), the selection criterion may be to select an object belonging to any object class that is underrepresented in the image dataset (e.g., any object class having a number of object instances in the image dataset below a minimum threshold). In another example, if the semantic augmentation is intended to correct for poor performance of a neural network which performs a prediction task on images that was trained on an image dataset (e.g., the target objective is to improve the performance of the neural network for any class in which the neural network underperforms), the selection criterion may be to select an object belonging to any object class for which the neural network has poor performance (e.g., has mean average precision (mAP) below a minimum threshold). In another example, the selection criterion may be to simply select an object belonging to the object class that has the highest similarity to the labeled objects in the segmented input image (e.g., the target objective is to increase the number of contextually relevant object instances in the input image). It should be understood that other selection criteria may be defined according to other target objectives of the semantic augmentation. It should also be understood that the selection criterion may be a combination of different criteria.

In some examples, the selection criterion may include a requirement that the similarity score must satisfy (e.g., meet or exceed) a similarity threshold. For example, the selected object must be from an object class that has a similarity score with the labeled objects in the segmented input image that meets or exceeds the similarity threshold. Such a selection criterion may help to ensure that the selected object is contextually relevant to the labeled objects in the segmented input image. Such a selection criterion may also result in there being no objects selected to augment the segmented input image. The selection criterion may require the use of a similarity threshold in combination with another selection criterion discussed above. For example, the selection criterion may be to select an object belonging to an underrepresented object class and also require that the similarity threshold be satisfied. If the segmented input image does not include any labeled objects that are sufficiently similar to the underrepresented class, no objects from the underrepresented class may be selected to augment the segmented input image. For example, if the underrepresented class is the object class "airplanes" and the segmented input image is an underwater scene with labeled objects that are all underwater objects, the similarity score between the object class "airplanes" and the labeled objects may fail the similarity threshold and no object from the object class "airplanes" may be selected to augment the segmented input image. If no object is selected at step 210, the method 200 may end.

Thus, based on the similarity score and the defined selection criterion, at least one object class from the object bank is identified as being contextually relevant to the segmented input image and also related to the target objective of the image augmentation. In some examples, the object class may be identified based on a selection criterion that aims to improve a certain image dataset. In other examples, the object class may be identified based on a selection criterion that is based only on the similarity scores without consideration of any specific image dataset. In some examples, the selection criterion may have already been taken into account when computing similarity scores at step 208 (e.g., similarity scores are computed only with respect to the object classes of interest as indicated by the selection criterion), such that the selection of at least one object at step 210 may need to be based on only the similarity score.

An object belonging to the identified object class is selected from the object bank. The object may be selected at random from among all objects belonging to the object class in the object bank. More specifically, an object image that is associated with the identified object class (e.g., associated with an object class label belonging to the identified object class) may be selected at random, and the mask associated with the object image may be used to isolate the object from the object image.

At 212, the selected object is added into the segmented input image to generate a new generated image. In some examples, the selected object may be added at any arbitrary location in the segmented input image. In other examples, the selected objected may be added at a selected location in the segmented input image, where the selected location is selected based on the location of other objects already in the segmented input image. For example, a contextually relevant object in the segmented input image that is most similar with (e.g., having the highest similarity score with) the object class of the selected object may be used as a basis for selecting the location to add the selected object. The selected location may be determined by selecting a location that places the selected object next to, but not obscuring, the contextually relevant object in the segmented input image. For example, the coordinates in the middle of the contextually relevant object may be determined (e.g., the middle of the contextually relevant object may be determined to be the middle of the associated bounding box, or may be determined to be the middle of the area of associated pixels), then the x and/or y coordinates may be adjusted (e.g., increased or decreased) to achieve a desired amount of overlap (e.g., no overlap, partial overlap, or completely overlapped) between the contextually relevant object and the selected object that is added. If the contextually relevant object is a background object, then the selected object may be added in the middle of the contextually relevant object without adjusting for overlap.

In some examples, the method 200 may end following step 212 and the generated image may be outputted. For example, the generated image may be outputted to be stored in an image dataset, which can then be used to train a neural network which performs a prediction task for images. In some examples, optional steps 214 and/or 216 may be performed on the generated image.

Optionally, at 214, object augmentation may be performed on the selected object that is added in the generated image. Object augmentation refers to modifications that are performed only on the selected object and not the global image. This object augmentation may occur prior to, during, or after the selected object has been added. The object augmentation may be performed to better match the image properties of the selected object to the image properties of the generated image as a whole, for example. Various techniques may be used for object augmentation including, for example, rotation, flipping, scaling, histogram equalization, converting to grayscale, and/or color balancing, among others. Additionally or alternatively, the selected object may be blended into the scene of the generated image as a whole, using any suitable technique such as Gaussian blending, or Poisson blending, among others. The optional object augmentation at step 214 may be performed to achieve a generated image that appears more natural (e.g., that visually resembles an image that has not be semantically augmented). A more natural-seeming generated image may be more useful for training an object detection neural network (e.g., the neural network is less likely to learn unintended unnatural features).

Optionally, at 216, global image augmentation may be performed on the generated image. This may be any existing image augmentation technique that can be used to augment an image including, for example, flipping, cropping, rotating, color jittering, edge enhancement, and/or converting to grayscale, among others. The globally augmented generated image may be outputted in addition to or instead of the generated image originally generated at step 212, for example.

Using the example method 200, a semantically augmented image is generated from an input image. The generated image includes one or more added objects that are contextually relevant to the labeled objects originally in the input image. Further, the added objects may be added in a way that results in a more natural-seeming generated image (e.g., added objects are added in selected locations close to contextually relevant objects). The generated image may be added to an existing image dataset, for example to correct for class imbalance in the image dataset or to introduce a new object class into the image dataset. The generated image may also be used to create a new image dataset.

An example method for creating an object bank is now discussed. The object bank may be a source of objects that can be used for semantic augmentation, as described above.

Figure 3:
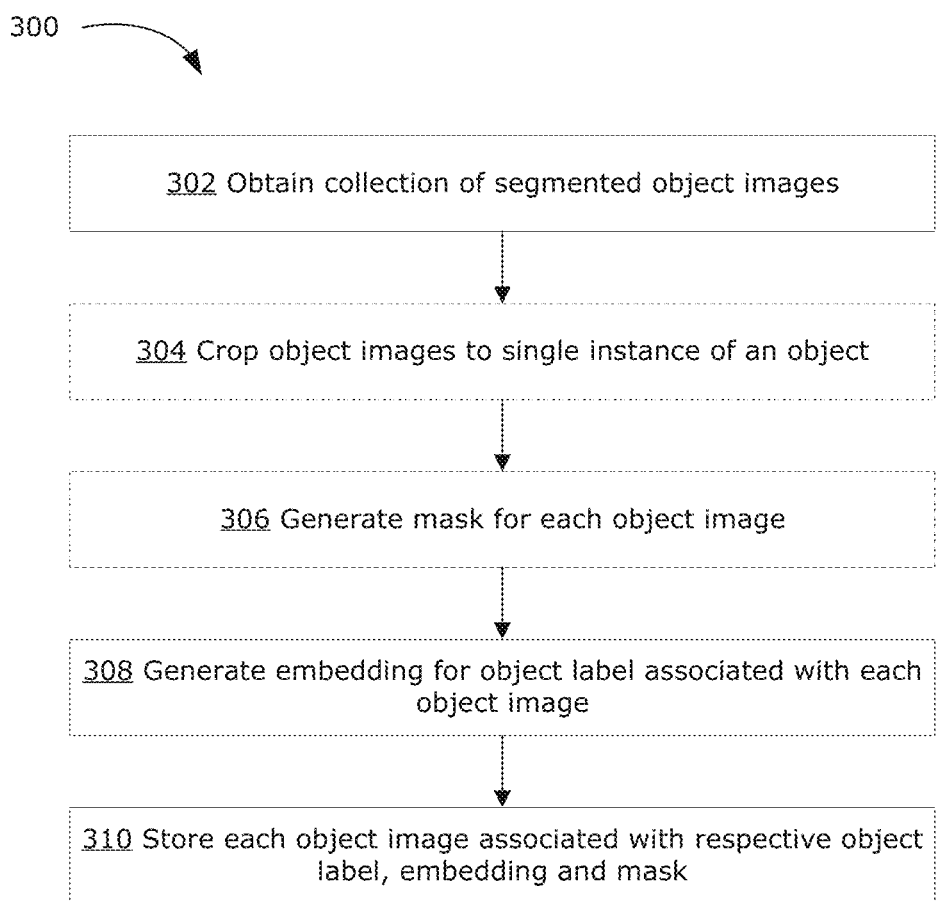
FIG. 3 is a flowchart of an example method for creating an object bank.

FIG. 3 is a flowchart illustrating an example method for creating an object bank. The object bank may be created any time prior to performing the method 200. Creation of the object bank using the method 300 may be performed by the same or different computing system which is used to perform the method 200. Further details of example systems for performing the example methods for creating an object bank disclosed herein are discussed further below.

At 302, a collection of segmented object images is obtained. The collection of segmented object images may be any large collection of images that preferably contain object instances covering a large number of object classes, such as an online image database, or an aggregation of multiple image datasets, among other possibilities. Because the object bank is not directly used for training the neural network which performs a prediction task, such as object detection, it may not be necessary for the collection of segmented object images to represent a common domain and/or have similar image qualities. This may enable the collection of segmented object images (and the resulting object bank created therefrom) to contain a large number of object instances covering a large number of object classes. Further, unlike images that are used for training purposes, the object images in the object bank may not need to be representative of how the objects would be found in real-life images (e.g., objects may be shown in a pure white background, or otherwise decontextualized).

The images in the collection of segmented object images may have been segmented using any suitable object detection and segmentation techniques. Each segmented object image may thus be already associated with at least one object label.

Optionally, at 304, the object images may be cropped to limit each object image to a single instance of an object. For example, if an object image from the collection obtained at step 302 includes multiple objects, the object image may be cropped to obtain individual object images each containing a single instance of an object. Cropping may also be performed to remove as much background as possible from the object image. The cropping may be performed by cropping the image to just the bounding box of each object instance, for example. This cropping may help to reduce the size of the object image (e.g., to help reduce the memory required to store the object image in the object bank) and/or to enable the object in the object image to be easier to add into another image during semantic augmentation.

Optionally, at 306, a mask may be generated for each object image. For example, a pixel-wise binary mask may be generated, to segment the pixels corresponding to the object from other background pixels in the object image. In some examples, this step may be omitted (e.g., the collection of segmented object images obtained at step 302 may already include masks).

At 308, an embedding is generated for the object label associated with each object image. The embedding may be generated any suitable embedding technique (e.g., BERT, Word2Vec, GloVe, or fastText). For example, similar to the generation of object label embeddings at step 206 described above, the generation of embeddings for each object image at step 308 may include accessing a dictionary of embeddings that has already been generated by a pre-trained embedder, looking up an entry in the dictionary corresponding to the object label associated with the object image, and selecting the corresponding embedding from the dictionary. It should be noted that, in order for the embeddings of the object bank to be comparable with the embeddings of the input image being augmented during semantic augmentation, the embedding technique used for generating embeddings at step 308 (and the dimension size of the embeddings) should be the same as the embedding technique used for generating embeddings at step 206 described above. In examples in which embeddings are generated at steps 206 and 308 by accessing an already generated dictionary of embeddings, the same dictionary should be accessed at step 206 and at step 308.

At 310, each object image is stored in association with the respective object label, respective embedding and respective mask. In some examples, each object image may also be stored in association with a respective bounding box (if the object image has been cropped to the bounding box of the object, there may not be any bounding box associated with the object image). The result is the object bank that can be used to select objects for semantic augmentation, as described above. The object bank may be stored in a physical or virtual database, for example in a physical server or on a virtual server (e.g., using distributed resources on a cloud computing platform).

Figure 4:
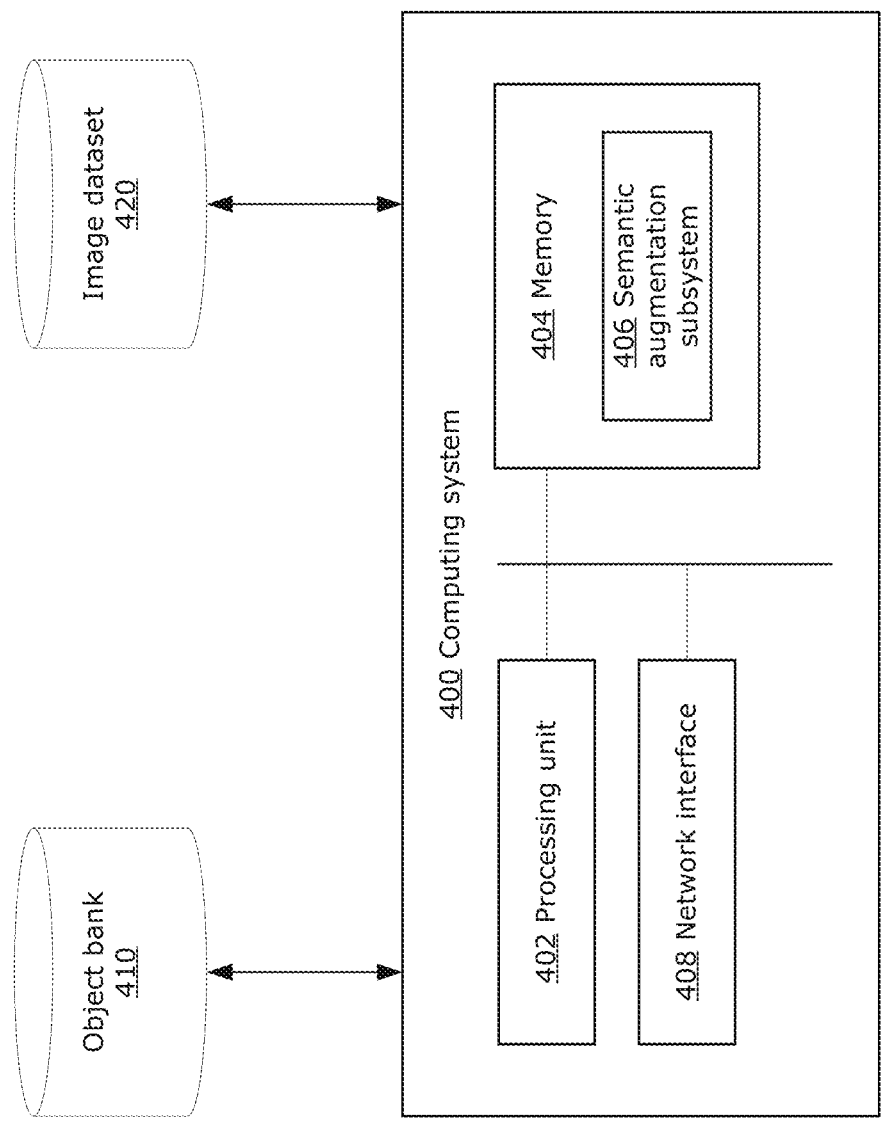
FIG. 4 is a block diagram of an example computing system that may be used to implement example embodiments described herein.

FIG. 4 is a block diagram illustrating a simplified example implementation of a computing system 400, which may be suitable for implementing embodiments of the methods and systems described herein. For example, the computing system 400 may be used to perform semantic augmentation of an image using the method 200. The same or different computing system 400 may be used to create an object bank using the method 300. Examples of the methods and systems of the present disclosure may be implemented in other computing systems, which may include components different from those discussed below.

Although FIG. 4 shows a single instance of each component, there may be multiple instances of each component in the computing system 400. Further, although the computing system 400 is illustrated as a single block, the computing system 400 may be a single physical machine or device (e.g., implemented as a single server), or may comprise a plurality of physical machines or devices (e.g., implemented as a server cluster). For example, the computing system 400 may represent a group of servers or cloud computing platform providing a virtualized pool of computing resources (e.g., a virtual machine, a virtual server).

The computing system 400 may be, for example, a network side device (e.g., a server) that is accessible by and provides a service to one or more client devices (e.g., a user device). In other examples, the computing system 400 may be a user side device, such as a laptop, computer, tablet, or workstation, among other possibilities. In some examples, the computing system 400 may be an edge computing device.

The computing system 400 may include at least one processing unit 402, such as a processor, a microprocessor, a digital signal processor, an application-specific integrated circuit (ASIC), a field-programmable gate array (FPGA), a dedicated logic circuitry, a dedicated artificial intelligence processor unit, a tensor processing unit, a neural processing unit, a hardware accelerator, or combinations thereof.

The computing system 400 may include at least one network interface 408 for wired or wireless communication with other computing systems in a network. The network interface 408 may include wired links (e.g., Ethernet cable) and/or wireless links (e.g., one or more antennas) for intra-network and/or inter-network communications. For example, the network interface 408 may enable communication between the computing system 400, a computing system storing an object bank 410 (i.e. a database), and a computing system storing an image dataset 420. In some examples, the object bank 410 may be local to the computing system 400 (e.g., on the same cloud computing platform) or may be on another computing system (e.g., on a remote server) that is remotely accessible (i.e. accessible via a network) by the computing system 400. In some examples, the image dataset 420 may be stored on the same or different computing system as the object bank 410. In some examples, the image dataset 420 may be stored on a client device that communicates with the computing system 400 to access services provided by the computing system 400. For example, the computing system 400 may provide image augmentation services to augment an image dataset 420 managed by a client device.

The computing system 400 may include at least one memory 404, which may include a volatile or non-volatile memory (e.g., a flash memory, a random access memory (RAM), and/or a read-only memory (ROM)). The non-transitory memory 404 may store instructions for execution by the processing unit 402, such as to carry out example embodiments of the methods described in the present disclosure. For example, as shown in FIG. 4, the memory 404 may store instructions for a semantic augmentation subsystem 406, which instructions may be executed by the processing unit 402 in order to perform an example of the method 200. The memory 404 may include other instructions, such as for implementing the method 300, an operating system and other applications/functions. In some example embodiments, the processing unit 402 of the computing system 400 may additionally or alternatively execute instructions received from an external memory (e.g., an external drive in wired or wireless communication with the server) or may be provided executable instructions by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage.

The computing system 400 may also include other storage units (not shown), which may include a mass storage unit such as a solid state drive, a hard disk drive, a magnetic disk drive and/or an optical disk drive.

Examples of the system and method of the present disclosure may be implemented as part of the training of an object detection neural network. For example, semantic augmentation may be used to augment an image dataset prior to or during training of a neural network using that image dataset. For example, the computer system 400 may be a cloud computing platform that provides machine learning as a service (MLaaS) that provides services, including a training service to a client device for training an object detection neural network. The training service may provide the client device with an option to augment the image dataset 420, for example using the method for semantic augmentation disclosed herein.

Figure 5:
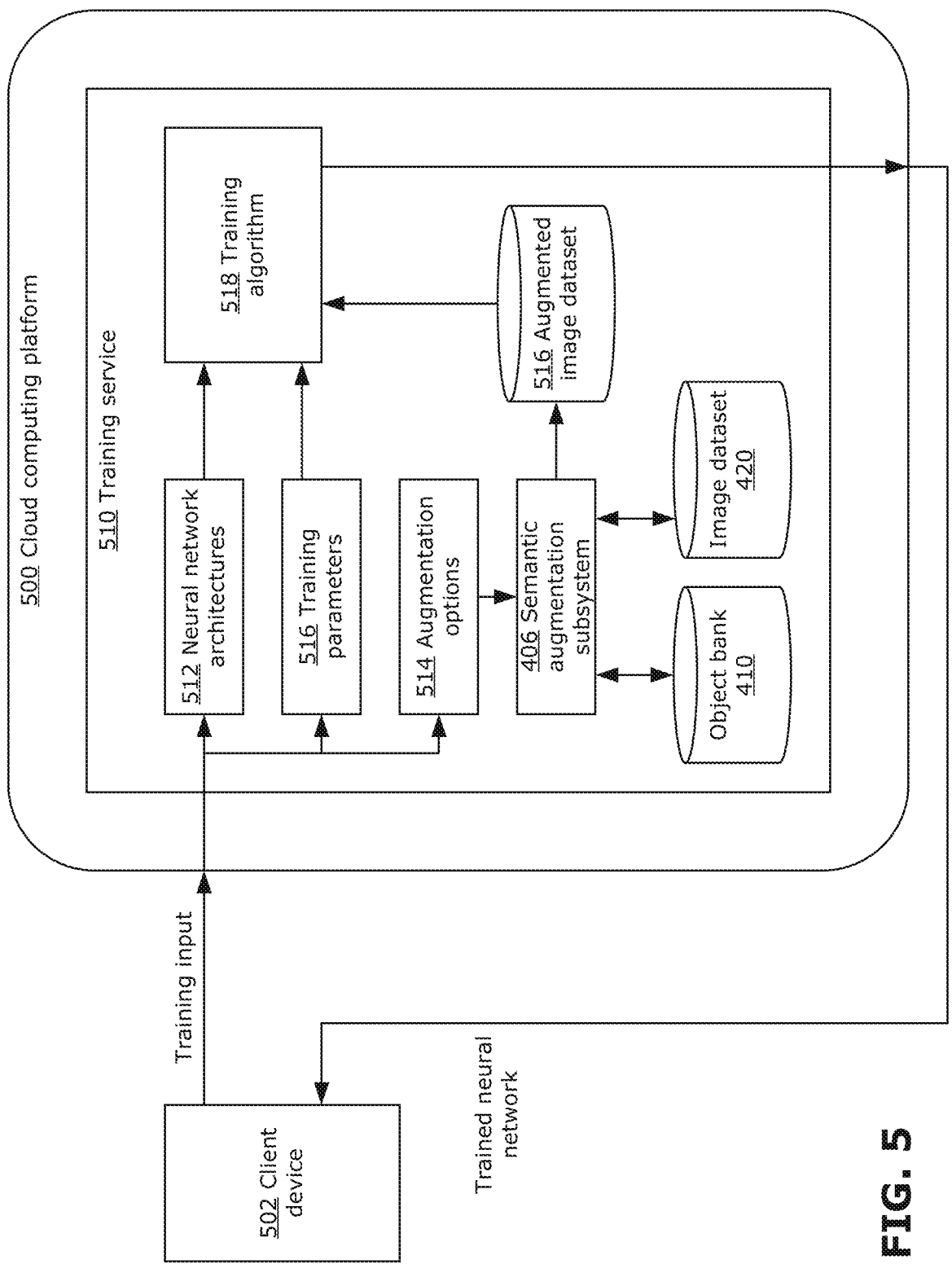
FIG. 5 is a block diagram of an example dataflow for training a neural network by a computing platform implementing example embodiments described herein.

FIG. 5 is a diagram illustrating an example dataflow for training an object detection neural network by a training service 510 of a MLaaS provided by a cloud computing platform 500. The training service 510 is used by a user to train a neural network which performs a prediction task for images, such as object detection or semantic segmentation. The MLaaS may be implemented using the infrastructure of the cloud computing platform, including virtualized computing resources (e.g., a virtual machine), or a computing cluster (e.g., using pooled resources), among other possibilities.

In this example, a client device 502 (e.g., a user equipment, client terminal, smartphone, laptop, tablet, personal computer, workstation, etc.) may communicate with the MLaaS provided the cloud computing platform 500 via a network to access services provided by the MLaaS, including the training service 510. The client device 502 may host an object detection neural network requiring training using the training service 510. Alternatively, the client device 502 may not currently have any object detection neural network and may request a trained object detection neural network from the MLaaS of the cloud computing platform 500.

The client device 502 provides training input to the SaaS platform 500. The training input may include, for example, the neural network architecture to be trained (e.g., selected from among the neural network architectures 512 available in the training service 510, such as Efficientdet, Mask R-CNN, YOLOv4, and other possible architectures), one or more training parameters (e.g., values for training parameters 516 that can be set for the training service 510, such as learning rate, batch size, number of epochs, etc.), and one or more augmentation techniques (e.g., selected from augmentation technique options 514 available in the training service 510). In particular, the augmentation options 514 available in the training service 510 may include global image augmentation techniques (e.g., image scaling, image rotation, color jittering, etc.) as well as semantic augmentation techniques (e.g., semantic augmentation using the method 200 disclosed herein).

In some examples, instead of selection one of the neural network architectures 512 provided by the MLaaS, the client device 502 may provide a machine-learning model (e.g., communicated, via the network, to the MLaaS provided by the cloud computing platform 500 together with or following the training input) to be trained by the training service 510. For example, the client device 502 may already host an object detection neural network, and may use the training service 510 to further train the object detection neural network to update the parameters (e.g. weights and biases) of the object detection neural network. In other examples, the training input may indicate another neural network architecture, from another database (e.g., another cloud computing resource) to be trained by the training service 510.

In some examples, the training service 510 may train the object detection neural network using an image dataset that is provided by the client device 502 (e.g., communicated to the cloud computing platform 500 together with or following the training input), or that is accessed from another database (e.g., another cloud computing resource). In other examples, the training service 510 may train the object detection neural network using an image dataset 420 that is provided by the MLaaS.

If the training input indicates that one or more augmentation options 514 should be used, image augmentation is performed to obtain an augmented image dataset 516. For example, semantic augmentation (e.g., performed by the semantic augmentation subsystem 406, using the method 200) may be performed by the training service 510 provided by the MLaaS to augment an image dataset provided by the client device 502 and/or provided by the MLaaS, to obtain the augmented image dataset 516. FIG. 5 illustrates an example in which the semantic augmentation subsystem 406 uses an object bank 410 and image dataset 420 provided by the MLaaS to generate the augmented image dataset 516. If semantic augmentation is selected to be used to augment an original image dataset 420 to obtain the augmented image dataset 516, the semantic augmentation may or may not be used to augment all images from the original image dataset 420. For example, only a portion (e.g., 25%, 50% or 75%) of the images of the original image dataset 420 may be semantically augmented. The images included in the portion that are semantically augmented may be selected according to the training input from the client device 502 or may be set by default for example. In other examples, semantic augmentation, if selected to be used, may be performed on all images from the original image dataset 420. It should be noted that, if semantic augmentation is performed on only the images of the portion of images of the original image dataset 420, global image augmentation (e.g., using existing techniques such as image flipping, rotation, color jittering, etc.) may be performed on all images, the same portion of images, or a different portion of images from the original image dataset 420.

The training service 510 may use a training algorithm 518 (e.g., using any suitable training algorithm, for example including any suitable backpropagation techniques) to train the selected neural network using the selected training parameters and the augmented image dataset 516. It should be noted that image augmentation (e.g., including semantic augmentation) may be performed prior to and/or during training of the selected neural network. For example, image augmentation may be performed to obtain the augmented image dataset 516 first, then the training algorithm 518 may be executed to train the selected neural network using the augmented image dataset 516. In some examples, in addition to or instead of image augmentation that is performed prior to training, image augmentation may be performed during training of the selected neural network, for example image augmentation may be performed for each epoch such that the selected network is being trained on a different augmented image dataset 516 for each epoch. Image augmentation that is performed prior to training and not during training of the selected neural network may be referred to as offline augmentation, whereas image augmentation that is performed during training of the selected neural network may be referred to as online augmentation (it should be understood that both offline and online image augmentation may be performed by the training service 510 of the MLaaS provided by the cloud computing platform 500, and the terms "offline" and "online" in this context does not refer to whether augmentation is being performed using a network).

The trained neural network may then be outputted by the training service 510 of the MLaaS and transmitted to the client device 502 via the network by the cloud computing platform 500. In some examples, such as where the client device 502 already hosts a pre-trained (or earlier) version of the object detection neural network, output provided to the client device 502 may be updated parameters (e.g., updated weights and biases) of the trained neural network. In examples in which the client device 502 does not already host a version of the neural network, the training service 510 of the MLaaS may output executable instructions of the neural network together the updated parameters, which may be transmitted from the cloud computing platform 500 to the client device 502. Alternatively, the client device 502 may not need to host the trained neural network, and may instead access the trained network (and updated parameters) hosted on the MLaaS of the cloud computing platform 500 and receive predictions (i.e. object class labels) from the MLaSS.

FIG. 6 illustrates an example user interface (UI) 600 that may be presented on a display device of the client device 502 to enable a user of the training service 510, to input the training input which is sent by the client device 502 to the MLaaS provided by the cloud computing platform 500. It should be understood that the UI 600 is only illustrative and is not intended to be limiting.

In this example, the UI 600 provides a selectable option 602 for a user of the training service 510 to provide a neural network (also referred to as a model) that is hosted by the client device 502 or to select from among the neural network architectures 512 hosted on the MLaaS of the cloud computing platform 500. For example, the selectable option 602 enables a user of the training service 510 to select a particular type of neural network which performs a prediction task for image, such as object detection or segmentation.

The UI 600 also provides a selectable option 604 for a user of the training service 510 to provide an image data to use for training a neural network or to select an image dataset 420 that is provided by the training service 510 of the MLaaS.

The UI 600 also provides a selectable option 606 for a user of the client device 502 to select one or more augmentation options 514 provided by the training service of the MLaaS provided by the cloud computing platform 500. In this example, the augmentation options 514 include both global image augmentation (e.g., imaging flipping or rotation) as well as sematic augmentation (e.g., using the method 200 disclosed herein). It should be understood that other augmentation options 514 may be available in addition to or instead of those illustrated in FIG. 6. If selection of the option 606 indicates that semantic augmentation is to be used, the UI 600 may present additional options 608-622 (e.g., options 608-622 may be displayed in the UI 600 only if semantic augmentation is selected at option 606; otherwise, options 608-622 may not be displayed in the UI 600).

The selectable option 608 enables a user of the training service 510 to select a trained embedder to use for generating embeddings for object class labels. For example, the MLaaS provided by the cloud computing 500 may host a plurality of pre-trained embedders and/or host (or have access to) a plurality of dictionary of embeddings generated by pre-trained embedders. Based on the selection indicated in the option 608, the training service 510 may then use the selected pre-trained embedder or the dictionary generated by the selected pre-trained embedder to generate embeddings for object class labels. A user of the training service 510 may also select a dimension size for the embeddings to be generated. For example, if the selected pre-trained embedder has been trained to generate embeddings (or has already generated a dictionary of embeddings) for different embedding dimensions (e.g., 50, 100, 200 or 300 dimensions), a user of the training service 510 may be able to select the dimension size to use for the embeddings. In other examples, such as if the selected pre-trained embedder generates embeddings of only one dimension size, a user of the training service 510 may not have an option to select the dimension size of the embeddings.

The selectable option 610 enables a user of the client training service 510 to indicate whether or not the image dataset, if provided by the client device 502 (e.g., as indicated at option 604), is already segmented. If the image dataset is not already segmented, the training service 510 provided by the MLaaS may use a trained object detection and segmentation neural network (which may be another service of the MLaaS of the cloud computing platform 500) to perform image segmentation at the start of semantic augmentation (e.g., at step 202 of the method 200).

The option 612 enables a user of the training service 510, via to provide object class labels associated with an image dataset, if the image dataset is provided by the client device 502 (e.g., as indicated at option 604). The MLaaS may, after receiving the object class labels from the client device 502, compare the object class labels with a dictionary of embeddings generated by the selected embedder. If there are any object class labels associated with the image dataset that does not have a match in the dictionary of embeddings (or for which an embedding cannot be generated using the selected pre-trained embedder), option 614 may be presented in the UI 600 to enable a user of the training service 510 to provide an alternative object class label. As discussed previously, in some examples an alternative object class label may be determined automatically without requesting input from a user of training service.

The selectable option 616 enables a user of the training service 510 to indicate a method to use for computing the similarity score (e.g., using Euclidean distance, cosine similarity, or another suitable technique; for example at step 208 of the method 200).

The selectable options 618 and 620 enables a user of the training service 510 to indicate the number of most similar objects to be considered and the selection criterion to be used (e.g., based on number of instances or baseline mAP) for selecting an object (e.g., at step 210 of the method 200) to augment an image.

The selectable option 622 enables a user of the training service 510 to indicate any object augmentation to be performed (e.g., at step 514 of the method 200) on the object that has been selected to augment an image.

The UI 600 may also provide options (not shown) to enable a user of the training service 510 to select training parameters to use for training the object detection neural network. Other options may be provided via the UI 600. For example, the UI 600 may include an option enabling a user of the training service 510 to select a similarity threshold for selecting an object to augment an image (e.g., the computed similarity score between the object class of the selected object and object class label(s) in the image must meet or exceed the similarity threshold).

It should be understood that one or more of the options discussed above may be omitted from the UI 600 and/or may not require input from a user of the training service 510. If an option is omitted and/or input from a user of the training service 510 is not provided for any selectable option, the training service 510 may use a default selection for that option. For example, instead of allowing a user of the training service 510 to select a pre-trained embedder to use for generating embeddings for the object class labels, a pre-trained embedder (or a dictionary of embeddings generated using the pre-trained embedder) may be selected or predefined by the training service 510.

Although described with respect to a training service 510 of the MLaaS 500 provided by a cloud computing provider, it should be understood that similar options may be available for local training of an object detection neural network (e.g., the UI 600 may be displayed by a computing system 400 on a display device of the computing system 400 and the computing system 400 itself may perform the method for semantic augmentation of images using a local semantic augmentation subsystem 406).

In various example studies, it has been found that performance of a neural network which performs a prediction task for images is improved after the neural network is trained on a semantically augmented image dataset (compared to performance of the same neural network after training on an un-augmented image dataset, or after training on an image dataset augmented using existing techniques), where the semantically augmented image dataset includes new images generated using the system and method for in accordance with the present disclosure.

In various examples, the present disclosure has described methods and systems for semantic augmentation of an image, in which the image is augmented by the addition of one or more contextually relevant objects. The disclosed semantic augmentation methods and systems may be used to semantically augment image datasets (e.g., to correct for class imbalance in an image dataset and/or to introduce a new object class to an image dataset). Neural networks that perform a prediction task for images that are trained using such semantically augmented image datasets may have improved performance, such as higher accuracy of predictions generated by the neural network. The methods and systems for semantic augmentation images disclosed herein may also benefit the training of any neural network which performs a prediction task for images, such as object detection, semantic segmentation, optical character recognition, or facial recognition, among other possibilities, without being limited to any particular neural network architecture.

The disclosed methods and systems for semantic augmentation of images do not require the use of an additional neural network to learn contextual relationships, and avoids the overhead and additional processing and memory burden associated with such an additional neural network. The disclosed methods and systems for semantic augmentation images also do not require changes to the architecture of the neural network being trained, and do not require computationally-expensive image transformation or generation.

The present disclosure has illustrated a relatively straightforward example of how the disclosed methods and systems for semantic augmentation images may be included as part of a training service of a MLaaS, for example. Other examples of the methods and systems for semantic augmentation of images may be implemented as standalone software installed on running on a computing system, such as a physical machine (e.g. server), a cluster of physical machines (e.g. a cluster of servers), or one or more virtual machines provided by a cloud computing platform.

The disclosed methods and systems for semantic augmentation of images may be useful for applications related to instance segmentation as well as object detection. The disclosed methods and systems for semantic augmentation of images may be used for self-supervised training of a neural network which performs a prediction task for images using a semantically augmented image dataset.

Examples of the present disclosure may be useful to increase the usefulness of an image dataset, for example if real-life images of a given object class are rare or non-existent in the image dataset, by adding instances of the rare object class into contextually relevant images in the image dataset. Examples of the present disclosure may also enable an image dataset that is in one domain (e.g., showing isolated objects against a white background) to be adapted to a different domain (e.g., showing objects in a real-life urban environment), by adding objects from one domain into a different domain in a contextually relevant manner.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute example embodiments of the methods disclosed herein. The machine-executable instructions may be in the form of code sequences, configuration information, or other data, which, when executed, cause a machine (e.g., a processor or other processing device) to perform steps in a method according to example embodiments of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method for generating an augmented image, the method comprising:
   generating an embedding for each object class label associated with a segmented input image;
   for each embedding associated with a respective object class label, computing a similarity score between the embedding associated with the object class label and an embedding representing an object class in an object bank comprising a plurality of object images;
   selecting at least one object, associated with a respective object image in the object bank, the selected at least one object being from an identified object class that is identified as contextually relevant to at least one object class label associated with the segmented input image, based at least on the similarity score; and
   adding the selected at least one object into the segmented input image to generate the augmented image by:
      identifying a contextually relevant object in the segmented input image, the contextually relevant object being identified based on the similarity score with the selected at least one object; and
      adding the selected at least one object in a selected location relative to a location of the contextually relevant object.

2. The method of claim 1, wherein generating the embedding for each object class label comprises:
   accessing a dictionary of embeddings containing a plurality of entries each associating a text string with a respective corresponding embedding; and
   selecting the embedding for each object class label by looking up the text string in the dictionary of embeddings corresponding to each object label.

3. The method of claim 1, wherein computing the similarity score comprises computing a cosine similarity or a Euclidean distance between the embedding associated with the respective object class label and the embedding representing the object class in the object bank.

4. The method of claim 1, wherein adding the selected at least one object further comprises applying a pixel-wise mask to the respective object image to segment the at least one object from the respective object image, and adding the segmented at least one object into the segmented input image.

5. The method of claim 1, wherein the selected at least one object is from the identified object class that is identified based on a selection criterion to improve the original image dataset or to improve performance of the trained neural network.

6. The method of claim 1, further comprising:
   performing object segmentation to an input image to generate the segmented input image.

7. The method of claim 1, wherein adding the selected at least one object further comprises performing object augmentation on the selected at least one object, and adding the augmented at least one object into the segmented input image to generate the augmented image.

8. The method of claim 1, further comprising:
   performing global image augmentation on the augmented image.

9. The method of claim 1, further comprising:
   sampling the segmented input image from an image dataset; and
   storing the augmented image in the same or different image dataset.

10. A method for improving performance of a neural network trained using an original image dataset, the method comprising:
   generating an augmented image dataset from the original image dataset by, for one or more segmented images sampled from the original image dataset, generating a respective semantically augmented image by:
      generating an embedding for each object class label associated with the segmented image;
      for each embedding associated with a respective object label, computing a similarity score between the embedding associated with the object label and an embedding representing an object class in an object bank storing a plurality of object images;
      selecting at least one object, associated with a respective object image in the object bank, the selected at least one object being from an identified object class that is identified as contextually relevant to at least one object label associated with the segmented input image, based at least on the similarity score; and
      adding the selected at least one object into the segmented image to generate the respective semantically augmented image; and
   re-training the neural network using the augmented image dataset.

11. The method of claim 10, wherein generating the embedding for each object class label comprises:
   accessing a dictionary of embeddings containing a plurality of entries each associating a text string with a respective corresponding embedding; and
   selecting the embedding for each object label by looking up the text string in the dictionary of embeddings corresponding to each object label.

12. The method of claim 10, wherein the one or more segmented images sampled from the original image dataset is a portion of all images contained in the original image dataset.

13. The method of claim 12, wherein, for one or more images from the original image dataset that is not used to generate semantically augmented images, global image augmentation is performed to generate globally augmented images for the augmented image dataset.

14. The method of claim 10, wherein computing the similarity score comprises computing a cosine similarity or a Euclidean distance between the embedding associated with the respective object label and the embedding representing the object class in the object bank.

15. The method of claim 10, wherein adding the selected at least one object comprises:
identifying a contextually relevant object in the segmented image, the contextually relevant object being identified based on the similarity score with the selected at least one object; and
adding the selected at least one object in a selected location relative to a location of the contextually relevant object.

16. The method of claim 10, wherein the selected at least one object is from the identified object class that is identified based on a selection criterion to improve the original image dataset or to improve performance of the trained neural network.

17. The method of claim 10, wherein the augmented image dataset is generated by adding the respective semantically augmented image to the original image dataset.

18. The method of claim 10, wherein the augmented image dataset is generated by creating a new image dataset using the respective semantically augmented image.

19. A computing system comprising:
a memory; and
a processing device in communication with the memory, the processing device configured to execute instructions to cause the computing system to:
generate an embedding for each object class label associated with a segmented input image;
for each embedding associated with a respective object class label, compute a similarity score between the embedding associated with the object label and an embedding representing an object class in an object bank storing a plurality of object images;
select at least one object, associated with a respective object image in the object bank, the selected at least one object being from an identified object class that is identified as contextually relevant to at least one object label associated with the segmented input image, based at least on the similarity score; and
add the selected at least one object into the segmented input image to generate the augmented image by:
identifying a contextually relevant object in the segmented input image, the contextually relevant object being identified based on the similarity score with the selected at least one object; and
adding the selected at least one object in a selected location relative to a location of the contextually relevant object.

20. The computing system of claim 19, wherein the processing device is further configured to execute instructions to cause the computing system to generate the embedding for each object class label by:
accessing a dictionary of embeddings containing a plurality of entries each associating a text string with a respective corresponding embedding; and
selecting the embedding for each object class label by looking up the text string in the dictionary of embeddings corresponding to each object label.

* * * * *